United States Patent
Humphrey

(10) Patent No.: US 7,037,519 B1
(45) Date of Patent: May 2, 2006

(54) NUTRITIONAL SUPPLEMENT AND METHODS OF MAKING

(76) Inventor: Donna Humphrey, 924 Berkley Rd., Auburndele, FL (US) 33823

(*) Notice: Subject to any disclaimer, the term of this patent is extended or adjusted under 35 U.S.C. 154(b) by 257 days.

(21) Appl. No.: 10/255,782

(22) Filed: Sep. 25, 2002

(51) Int. Cl.
- A61K 9/127 (2006.01)
- A61K 9/48 (2006.01)
- A61K 9/20 (2006.01)
- A61K 9/14 (2006.01)
- A61K 9/16 (2006.01)

(52) U.S. Cl. ............ 424/450; 424/400; 424/451; 424/464; 424/489; 424/490; 424/725; 424/754; 424/765

(58) Field of Classification Search ......... 424/400, 424/401, 450, 451, 464, 489, 490, 725, 754, 424/765
See application file for complete search history.

(56) References Cited

U.S. PATENT DOCUMENTS

| | | | |
|---|---|---|---|
| 4,737,323 A * | 4/1988 | Martin et al. ............ | 264/4.3 |
| 5,215,769 A * | 6/1993 | Fox et al. ............... | 426/74 |
| 5,891,465 A * | 4/1999 | Keller et al. ............ | 424/450 |
| 5,993,853 A * | 11/1999 | Manning et al. ......... | 424/456 |
| 6,605,296 B1 * | 8/2003 | Stuckler ................. | 424/439 |
| 2002/0009482 A1 * | 1/2002 | Adams ................... | 424/439 |
| 2002/0193323 A1 * | 12/2002 | Yegorova ................ | 514/33 |

FOREIGN PATENT DOCUMENTS

| | | | |
|---|---|---|---|
| DE | 19907586 A1 * | 8/2000 | |
| DE | 10036920 A1 * | 2/2002 | |
| JP | 07008201 A * | 1/1995 | |
| KR | 2001069834 A * | 7/2001 | |

OTHER PUBLICATIONS

Eskander et al., "Biomedical and hormonal aspects of apple vinegar", Egyptian Journal of Pharmaceutical Sciences, vol. 40, No. 2, pp. 153-166, 1999 (2001), Abstract.*

* cited by examiner

Primary Examiner—Sreeni Padmanabhan
Assistant Examiner—Marina Lamm

(57) ABSTRACT

Nutritional supplements and methods for making same supplement the intake of nutrition from foods. Garlic and apple cider vinegar are currently available in separate forms and are popular with consumers. However, heretofore these two ingredients have not been available together. By combining garlic and apple cider vinegar into one convenient, easy to take tablet, capsule, or gel encapsulated liquid, a person only has to consume one pill instead of two. Furthermore, consumption of garlic and apple cider vinegar in pill form allows for a higher concentration of active ingredients than are present in naturally occurring garlic and apple cider vinegar. Furthermore, potentially offensive tastes and odors present in naturally occurring garlic and apple cider vinegar are avoided.

11 Claims, 1 Drawing Sheet

NUTRITIONAL SUPPLEMENT AND METHODS OF MAKING

BACKGROUND OF THE INVENTION

1. Field of the Invention

The present invention relates to a nutritional supplement and methods for making same for use in connection with nutrition. The nutritional supplement and methods for making same have particular utility in connection with consumption of garlic and apple cider vinegar.

2. Description of the Prior Art

Nutritional supplements and methods for making same are desirable for supplementing the intake of nutrition from foods. Garlic and apple cider vinegar are currently available in separate forms and are popular with consumers. However, heretofore these two ingredients have not been available together. By combining garlic and apple cider vinegar into one convenient, easy to take tablet, capsule, or gel encapsulated liquid, a person only has to consume one pill instead of two. Furthermore, consumption of garlic and apple cider vinegar in pill form allows for a higher concentration of active ingredients than are present in naturally occurring garlic and apple cider vinegar. Furthermore, potentially offensive tastes and odors present in naturally occurring garlic and apple cider vinegar are avoided.

The use of dietary supplements is known in the prior art. For example, U.S. Pat. No. 5,993,853 to Manning et al. discloses a dietary supplement. However, the Manning et al. '853 patent does not have garlic, and has further drawbacks of not reacting the apple cider vinegar with lecithin and chloroform.

U.S. Pat. No. 5,883,086 to Craft discloses a DHEA-containing nutritional supplement and methods for making same that contains a variety of vitamins, minerals, and plant extracts. However, the Craft '086 patent does not have apple cider vinegar, and additionally does not lyophilize its ingredients.

Similarly, U.S. Pat. No. 5,976,568 to Riley discloses a modular system of dietary supplement compositions for optimizing health benefits and methods that is composed of seven distinct modules for improving public health by ensuring adequate intake of micronutrients. However, the Riley '568 patent does not have apple cider vinegar, and also does not lyophilize its ingredients.

In addition, U.S. Pat. No. 4,313,960 to Campagne discloses a preparation of concentrated natural vinegar. However, the Campagne '960 patent does not include garlic, and does not react the vinegar with lecithin and chloroform.

Furthermore, U.S. Pat. No. 4,059,695 to Hirosaki et al. discloses a method for manufacturing a tonic compositions for man and other animals that is obtained from components extracted from comfrey leaves and leaves of one or more plants by refined wood vinegar. However, the Hirosaki et al. '695 patent does not have garlic, and also lacks apple cider vinegar.

Lastly, U.S. Pat. No. Des. 430,932 to Vickery et al. discloses a capsule. However, the Vickery et al. '932 patent does not have garlic, and has the additional deficiency of lacking apple cider vinegar.

While the above-described devices fulfill their respective, particular objectives and requirements, the aforementioned patents do not describe a nutritional supplement and methods for making same that allows consumption of garlic and apple cider vinegar. The Manning et al. '853 patent, the Campagne '960 patent, the Hirosaki et al. '695 patent, and the Vickery et al. '932 patent make no provision for garlic. The Craft '086 patent, the Riley '568 patent, the Hirosaki et al. '695 patent, and the Vickery et al. '932 patent make no provision for apple cider vinegar.

Therefore, a need exists for a new and improved nutritional supplement and methods for making same that can be used for consumption of garlic and apple cider vinegar. In this regard, the present invention substantially fulfills this need. In this respect, the nutritional supplement and methods for making same according to the present invention substantially departs from the conventional concepts and designs of the prior art, and in doing so provides an apparatus primarily developed for the purpose of consumption of garlic and apple cider vinegar.

SUMMARY OF THE INVENTION

In view of the foregoing disadvantages inherent in the known types of dietary supplements now present in the prior art, the present invention provides an improved nutritional supplement and methods for making same, and overcomes the above-mentioned disadvantages and drawbacks of the prior art. As such, the general purpose of the present invention, which will be described subsequently in greater detail, is to provide a new and improved nutritional supplement and methods for making same which has all the advantages of the prior art mentioned heretofore and many novel features that result in a nutritional supplement and methods for making same which is not anticipated, rendered obvious, suggested, or even implied by the prior art, either alone or in any combination thereof.

To attain this, the present invention essentially comprises a dietary supplement made from five percent by weight garlic, five percent by weight apple cider vinegar, and 90 percent by weight binders.

There has thus been outlined, rather broadly, the more important features of the invention in order that the detailed description thereof that follows may be better understood and in order that the present contribution to the art may be better appreciated.

The invention may also include the garlic having been reacted with lecithin and chloroform to form a garlic liposome. The apple cider vinegar may have been reacted with lecithin and chloroform to form an apple cider vinegar liposome. The garlic liposome and apple cider vinegar liposome may be homogenized. The garlic may have been processed with a microfluidizer to form a garlic emulsion. The apple cider vinegar may take the form of an emulsion. The garlic and the apple cider vinegar may be lyophilized. The dietary supplement may be packaged in tablets, capsules, or as an encapsulated liquid. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved nutritional supplement and methods for making same that has all of the advantages of the prior art dietary supplements and none of the disadvantages.

It is another object of the present invention to provide a new and improved nutritional supplement and methods for making same that may be easily and efficiently manufactured and marketed.

An even further object of the present invention is to provide a new and improved nutritional supplement and methods for making same that has a low cost of manufacture with regard to both materials and labor, and which accordingly is then susceptible of low prices of sale to the consuming public, thereby making such nutritional supplement and methods for making same economically available to the buying public.

Still another object of the present invention is to provide a new nutritional supplement and methods for making same that provides in the apparatuses and methods of the prior art some of the advantages thereof, while simultaneously overcoming some of the disadvantages normally associated therewith.

Even still another object of the present invention is to provide a nutritional supplement and methods for making same for consumption of garlic and apple cider vinegar. This allows the user to consume both garlic and apple cider vinegar in one pill.

Still yet another object of the present invention is to provide a nutritional supplement and methods for making same for consumption of garlic and apple cider vinegar. This makes it possible to avoid unpleasant tastes and odors present in naturally occurring garlic and apple cider vinegar.

An additional object of the present invention is to provide a nutritional supplement and methods for making same for consumption of garlic and apple cider vinegar. This makes it possible to consume a higher concentration of active ingredients than are present in naturally occurring garlic and apple cider vinegar.

Lastly, it is an object of the present invention to provide a new and improved nutritional supplement and methods for making same for consumption of garlic and apple cider vinegar.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figure 1:
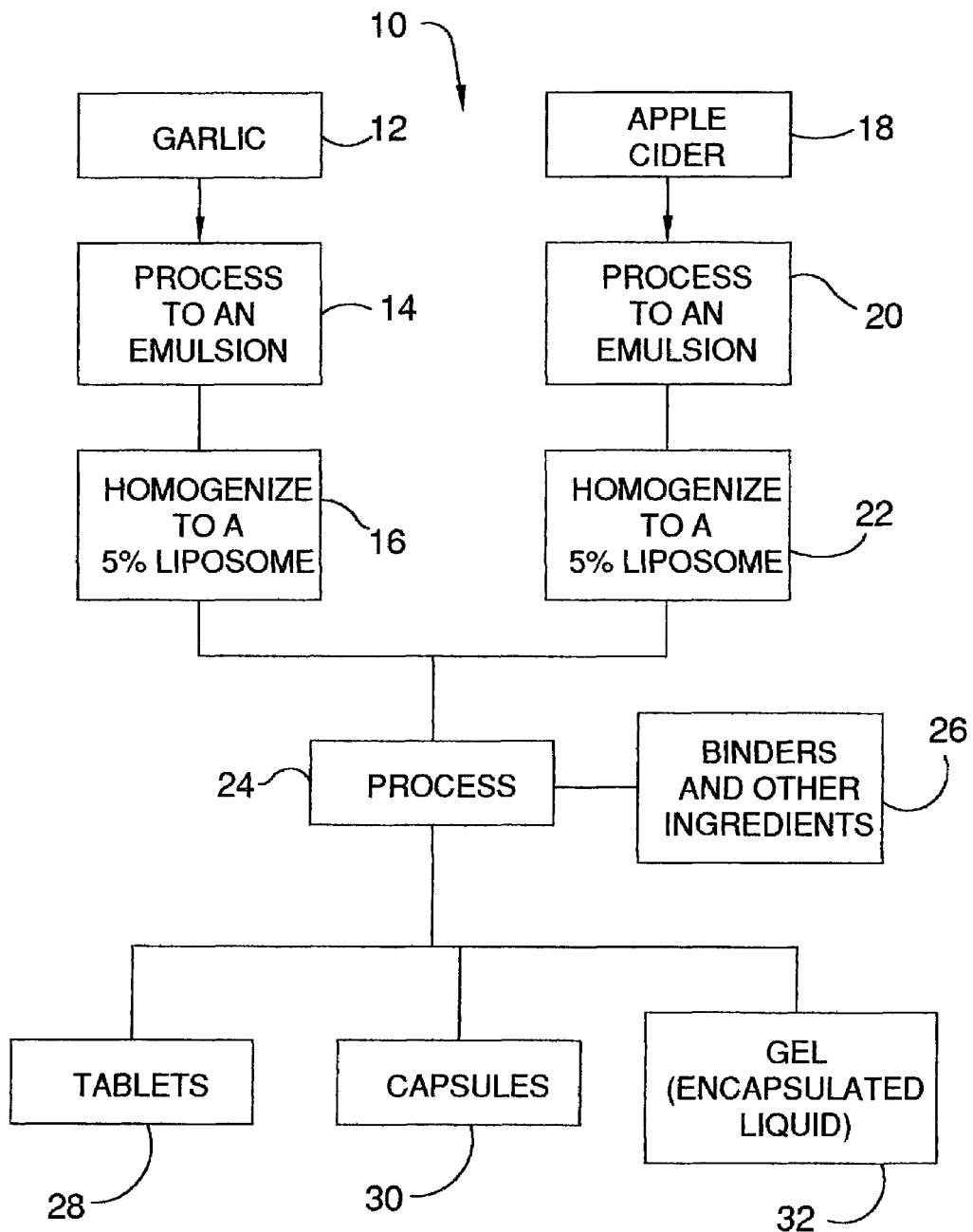
FIG. 1 is a flowchart of the current embodiment of the nutritional supplement and methods for making same constructed in accordance with the principles of the present invention.

Referring now to the drawings, and particularly to FIG. 1 a current embodiment of the nutritional supplement and methods for making same of the present invention is shown and generally designated by the reference numeral 10.

In FIG. 1, a new and improved nutritional supplement and methods for making same 10 of the present invention for consumption of garlic and apple cider vinegar is illustrated and will be described. More particularly, the nutritional supplement and methods for making same 10 consists of garlic 12 and apple cider vinegar 18. Garlic 12 is processed to an emulsion by step 14, and then homogenized to a 5 percent liposome in step 16. Apple cider vinegar 18 is processed to an emulsion by step 20, and is then homogenized to a 5 percent liposome by step 22. In step 24, the outputs of steps 16 and 22 are mixed with binders and another ingredients 26 to form tablets 28, capsules 30, and gels (encapsulated liquid) 32.

While a current embodiment of the nutritional supplement and methods for making same has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, the garlic and apple cider vinegar may be lyophilized instead of being converted to the liposomes described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A nutritional supplement comprising:
    garlic, wherein said garlic is in the amount of 5% by weight and has reacted with lecithin and chloroform to form a garlic liposome;
    apple cider vinegar, wherein said apple cider vinegar is in the amount of 5% by weight and has reacted with lecithin and chloroform to form an apple cider vinegar liposome; and
    binders, wherein said binders are in the amount of 90% by weight.

2. The nutritional supplement as defined in claim 1, wherein said garlic has been subjected to a microfluidizer to produce a garlic emulsion.

3. The nutritional supplement as defined in claim 1, wherein said garlic liposome has been homogenized.

4. The garlic nutritional supplement as defined in claim 3, wherein said garlic liposome has been lyophilized.

5. The nutritional supplement as defined in claim 1, wherein said apple cider vinegar liposome has been homogenized.

6. The nutritional supplement as defined in claim 5, wherein said apple cider vinegar liposome has been lyophilized.

7. The nutritional supplement as defined in claim 1, wherein said nutritional supplement is packaged in tablets.

8. The nutritional supplement as defined in claim 1, wherein said nutritional supplement is packaged in capsules.

9. The nutritional supplement as defined in claim 1, wherein said nutritional supplement is packaged as an encapsulated liquid.

10. The nutritional supplement as defined in claim 1, wherein said nutritional supplement is a fine granulated powder.

11. The nutritional supplement as defined in claim 1, wherein said nutritional supplement is a liquid.

* * * * *